UNITED STATES PATENT OFFICE.

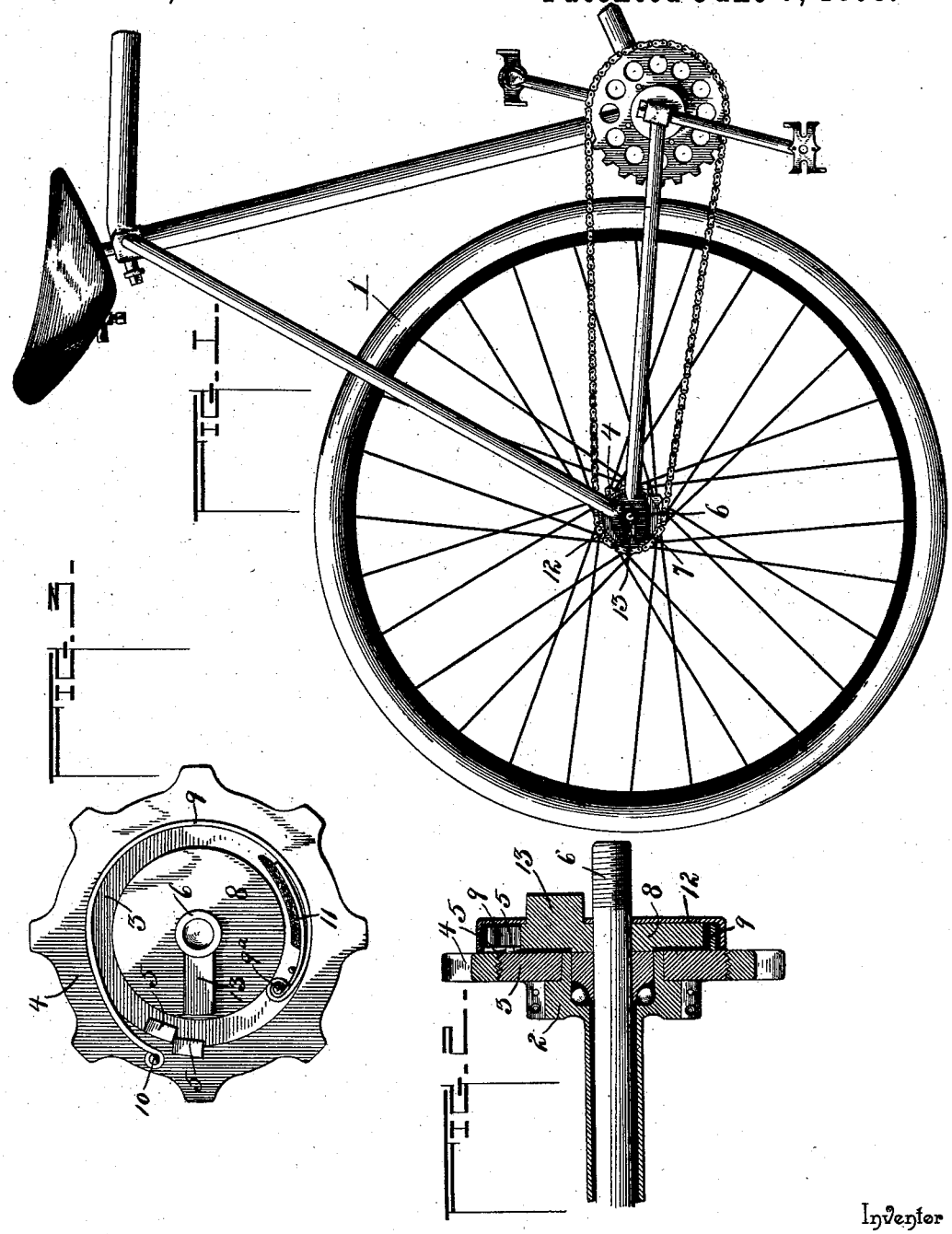

CHARLES M. FOBES, OF WEST WILLIAMSFIELD, OHIO.

BICYCLE-BRAKE.

SPECIFICATION forming part of Letters Patent No. 605,092, dated June 7, 1898.

Application filed August 5, 1896. Serial No. 601,761. (No model.)

*To all whom it may concern:*

Be it known that I, CHARLES M. FOBES, a citizen of the United States, residing at West Williamsfield, in the county of Ashtabula and State of Ohio, have invented a new and useful Bicycle-Brake, of which the following is a specification.

This invention relates to brakes, and is especially designed for use upon bicycles.

The object of the present invention is to provide in connection with the hub of the driving-wheel of the bicycle or similar vehicle a strap-brake adapted by suitable mechanism to retard the forward revolution of said wheel and to be thrown into action by the voluntary or involuntary back-pedaling of the rider.

The invention consists in certain novel features and details of construction and arrangement of parts, as hereinafter fully described, illustrated in the drawings, and pointed out in the claim hereto appended.

In the accompanying drawings, Figure 1 is a side elevation of a sufficient portion of a bicycle to illustrate the application of the improved brake thereto and its location thereon. Fig. 2 is an enlarged transverse section taken in line with the drive-wheel axle. Fig. 3 is a detail elevation showing the sprocket-rim, the stationary center or hub portion of the sprocket, the friction-wheel, and the relation of the strap-brake to such parts.

Similar numerals of reference designate corresponding parts in the several figures of the drawings.

The improved brake contemplated in the present invention may be applied to any chain-driven vehicle, but for the purpose of illustration is shown as applied to the rear or driving wheel of a bicycle.

Referring to the drawings, 1 designates the rear or driving wheel of a bicycle, to the hub 2 of which, upon one side, is rigidly secured a disk 3, having its periphery threaded to receive an internally-threaded open sprocket-rim 4, which is screwed to place thereon, as shown in Fig. 2. The disk 3 and rim 4 are each provided with a stop 5, and these stops coöperate to limit the turning of the rim on the disk 3 in one direction.

6 designates the stationary axle, mounted at its ends in the slotted ends 7, which connect the rear-fork sides and rear braces of the bicycle-frame. Upon this stationary axle is a fixed and stationary friction-disk 8, and extending around this friction-disk is a spring-strap brake 9, one end of which is secured to a laterally-projecting stud $9^a$ on the disk 3 and the other end to a laterally-projecting stud 10 on the sprocket-rim 4. This spring-strap is reinforced upon its inner active surface with a strip of leather or other suitable material, as indicated at 11. By the construction described it will be seen that when the sprocket-rim 4 is given a backward rotation relatively to the disk 3 on the wheel-hub the strap-brake will be wound closely around the stationary disk 8, and the motion of the wheel will be retarded proportionately to the power applied to the sprocket-rim 4 in a reverse direction from its normal rotation. Upon releasing the sprocket-rim 4 the spring-strap 9 will operate to turn the rim 4 forward until the stops 5 come together, when the strap-brake will be thrown entirely out of engagement with the friction-disk, thus leaving the wheel free to rotate.

12 designates an inclosing case or cover which embraces the axle 7 and covers in the operative parts of the brake mechanism, so as to protect the same from dust, moisture, &c. This case or cover 12 is held stationary by means of a laterally-projecting lug 13 on the stationary disk 8, said lug projecting through an opening in the cover 12 and entering the slot in the fork end at the adjacent side of the machine. This lug serves to take the additional strain put upon the axle by reason of the application of the brake to the disk 8, which is fast on and forms a part of the axle. From the sprocket-rim 4 a drive-chain extends to the front sprocket on the crank-axle in the usual manner.

From the foregoing description it will be seen that when the rider either voluntarily or involuntarily back-pedals the sprocket-rim 4 is backed or retarded sufficiently to apply the strap-brake to the stationary friction-disk 8 with a force proportionate to the pressure applied to the pedals. It will also be seen that the brake is extremely compact and that its presence can hardly be detected upon the machine. At the same time an effective and reliable brake is provided and one which may be manufactured at very low cost and applied to any bicycle on the market or other chain-driven vehicle.

It will be understood that the brake mechanism is susceptible of changes in the form, proportion, and minor details of construction, which may accordingly be resorted to without departing from the spirit or sacrificing any of the advantages of this invention.

By having the periphery of the disk 3 screw-threaded and the inner side of the sprocket-rim correspondingly screw-threaded the parts 3 and 4 may be comparatively thin and occupy the same vertical plane and will be prevented from relative lateral displacement, and upon removing one or the other of the stops 5 and disconnecting a terminal of the strap 9 from one of the parts 3 and 4 the sprocket-rim may be easily removed for any desired purpose. Inasmuch as a slight backward movement of the sprocket-rim insures an application of the brake the joint between the parts 3 and 4 will not be noticeable and offstanding parts are obviated.

Having thus described the invention, what is claimed as new is—

In a brake for bicycles and similarly-propelled machines, the combination of a disk applied to the hub of the drive-wheel and having its periphery screw-threaded, a sprocket-rim internally threaded and mounted upon the said disk to turn thereon, coöperating stops applied to the sprocket-rim and disk to limit the forward movement of the rim, a friction-disk concentrically mounted with the drive-wheel and having a lateral lug entering the slot in the fork member of the frame adjacent to the brake, a brake-strap surrounding the friction-disk and normally held out of action, and having its terminals secured, respectively, to the sprocket-rim and disk, and a casing inclosing the friction-disk, brake-strap and stops, and having an opening through which the aforesaid lug passes, substantially as set forth.

In testimony that I claim the foregoing as my own I have hereto affixed my signature in the presence of two witnesses.

CHARLES M. FOBES.

Witnesses:
EMMA FOBES,
MYRTLE FOBES.